United States Patent Office 3,300,474
Patented Jan. 24, 1967

3,300,474
SUCROSE ETHER COPOLYMERIZATES
Per Gustaf Magnus Flodin, Perstorp, and Björn Gustaf-Adolf Ingelman, Uppsala, Sweden, assignors to Aktiebolaget Pharmacia, a company of Sweden
No Drawing. Filed Feb. 12, 1964, Ser. No. 344,258
2 Claims. (Cl. 260—209)

This invention generally pertains to novel copolymerisates of sucrose. More particularly, this invention relates to high molecular weight copolymerisates obtained by reacting the sucrose with a bifunctional organic substance capable of reacting with the hydroxyl groups of the sucrose to form water soluble products possessing valuable properties for a number of different uses. By water-soluble products according to the invention are meant products which are so soluble in water that an aqueous (at least 10 percent) solution thereof can be prepared at 20° C. This invention also encompasses the process for the manufacture of such copolymerisates as well as a suspension stabilizing medium consisting of an aqueous solution comprising the novel copolymerisates.

THE INVENTION BROADLY

The novel copolymerisates according to the invention are obtained by reacting sucrose in aqueous solution in the presence of an alkaline reacting catalyst with a bifunctional compound selected from the group consisting of (1) compounds of the formula X–R–Z wherein X and Z each are selected from the group consisting of chloro and bromo, and R is an aliphatic radical, containing from 3 to 10 inclusive carbon atoms, and (2) corresponding epoxy compounds obtainable from compounds of the formula X R Z, wherein X, R and Z each have the above significance, by splitting off hydrogen halide from a halogen atom and a hydrogen atom from a hydroxyl group of the aliphatic radical R.

THE INVENTION MORE IN DETAIL

In the process according to the invention, the molar ratio between the bifunctional substance and sucrose should not be selected higher than that whereby a water soluble product is obtained. The polymerization reaction is generally caused to proceed until a copolymerisate of an average molecular weight in the range of from about 3,000 to 3,000,000 has been obtained. Preferably the average molecular weight ($\overline{M}_w$) of the novel copolymerisates should be in the range of from about 5,000 to 1,000,000 inclusive, for example in the range of from about 10,000 to 500,000 inclusive. In the reaction according to the invention, the molecules of the sucrose are combined into bigger molecules, containing a number of residues of sucrose, with formation of ether linkages of the type S—O—R—O—S, in which the symbols S each are residues of sucrose and R is the bridge resulting from the bifunctional substance. Using a bifunctional derivative of glycerine will result in the formation of a bridge of the type S—O—CH$_2$·CH(OH)·CH$_2$—O—S. Combining three residues of sucrose results in a copolymerisate having the following general formula: S—O—R—O—S—O—R—O—S, wherein S is the residue of sucrose and R has the same significance as set forth above. When a large number of residues of sucrose have been combined with each other, the resulting copolymerisate will thus contain many bridges of the type —O—R—O— between the residues of sucrose.

THE BIFUNCTIONAL ORGANIC SUBSTANCE

Suitable bifunctional substances for carrying out the process according to this invention may be selected from bifunctional glycerine derivatives such as epichlorohydrin, dichlorohydrin, epibromohydrin, dibromohydrin and from the group consisting of 1,2=3,4-diepoxybutan, bis-epoxypropyl ether, ethylene glycol-bis-epoxypropyl ether, and 1,4-butandiol-bis-epoxypropylether.

THE AQUEOUS MEDIUM AND THE REACTION CATALYST

The reaction is carried out in aqueous solution and in the presence of an alkaline reacting substance having a catalyzing effect on the reaction. Examples of suitable catalysts are the alkali metal hydroxides, preferably sodium hydroxide and potassium hydroxide, and the alkaline earth metal hydroxides, and also tertiary and quaternary amines. If halogen hydrins are used as bifunctional organic substances, the alkali or alkaline compound should preferably also serve to neutralize the hydrogen halide split off in the reaction, and for this purpose the amount of the alkaline compound should be greater than that which would otherwise be required for the reaction so as to maintain a pH on the alkaline side.

REACTION TEMPERATURES AND TIMES

The reaction may be varied within wide limits and as a consequence the reaction time will be dependent to a certain extent on the reaction temperature which has been chosen. With regard to the speed of reaction, it is advisable not to work at too low a temperature. However, on the other hand, in order to avoid undesirable side reactions, the temperature should not be too high, and in certain instances it may be desirable to utilize cooling means to control the temperature of the reaction. With due consideration to these circumstances, it is preferred to carry out the reaction at a temperature between about 15° C. and 60–90° C., preferably within the range of 30–75° C. However, it is conceivable that higher or lower temperatures could be used under certain circumstances.

THE AMOUNTS OF THE REACTANTS AND THE MIXING THEREOF

The concentration of the sucrose in the said aqueous solution may suitably be within the range of from about 10 percent to about 70 percent by weight.

The reaction is preferably carried out by mixing all of the reactants together at once, but it is also possible to carry out the reaction in steps, for example in such a way that the sucrose is caused to react with amounts of the bifunctional substance which are added successively stepwise, whereby the average molecular weight of the product is increased in steps. This manner of working may be suitable when it is desired to subject the product to an intermediate purifying treatment.

In using a derivative of glycerine, for example epichlorohydrin or dichlorohydrin, as a bifunctional substance it is possible to proceed in such a way that the alkaline reacting compound is added to a mixture of an aqueous solution of sucrose and the bifunctional derivative of glycerine which latter are then caused to react with each other.

PURIFICATION AND FURTHER TREATMENT OF THE NOVEL COPOLYMERISATES

The water soluble copolymerisates obtained can be purified in different ways, for example by precipitating them from a solution, preferably an aqueous solution, of the product by different alcohols or ketones, such as ethyl alcohol, isopropyl alcohol or acetone, or other substances in which the copolymerisates are only sparingly soluble. A purification can also be attained by dissolving the products obtained after the copolymerization in solvents in which they are soluble, but accompanying by-products or impurities are difficultly soluble, whereby the latter can be separated from the solution formed. Furthermore, the process products can be purified and freed from salts by using ion-exchangers. A further purification can be attained by adsorbing agents or by using such refining methods which are commonly used for purifying high molecular weight substances, for example dialysis.

Solutions of the novel high molecular weight water soluble substances consisting of a mixture of molecules of different size, can be subjected to fractionation by the aid of precipitating agents in which the substances are difficultly soluble, for example different alcohols and ketones such as ethyl alcohol, isopropyl alcohol, and acetone, whereby fractions are obtained which are less polydisperse than the original products. The fractionation is advisably carried out by adding to solutions of the products, for example in water or glycerine, a successively increasing amount of precipitating medium, the precipitated product being separated off after each addition. A fractionation can also be attained by fractionated dissolution.

Furthermore, products having too high an average molecular weight, for example a high molecular weight fraction separated off, can be subjected to a partial depolymerization, for example by a mild hydrolysis, for example by an acid, thereby to adjust it to a desired lower average molecular weight. Thus, for example, by a partial hydrolysis under acid conditions a desired number of glycosidic linkages between units of glucose and fructose can be broken up.

The novel copolymerisates are characterized by stating their average molecular weights ($\overline{M}_w$), for example determined by light scattering measurements or by ultracentrifugations and diffusion measurements. For many purposes, it is also advisable to determine the molecular weight distribution. Further, the limiting viscosity or intrinsic viscosity defined by the expression $$\lim_{c \to 0} \frac{\eta_{sp}}{C}$$

wherein $\eta_{sp}$ is the specific viscosity (=the relative viscosity—1) and C is the concentration of the high molecular weight product, for example expressed in grams per 100 ml. of solution, can be determined.

Especially for the manufacture of products for pharmaceutical purposes, for example for colloid solutions, the polymerization is caused to proceed until a product is obtained, the average molecular weight of which, if desired after fractionation, is in the range of from 10,000 to 100,000, for example in the range of from 10,000 to 80,000, more especially in the range of from 20,000 to 60,000. As an example may especially be mentioned a product having an average molecular weight ($\overline{M}_w$) amounting to about 40,000. Depending upon the field of application, the product is possibly subjected to a more or less far reaching fractionation and a sufficient purification. Especially for injection and infusion purposes, it is important that the product be sufficiently purified, whereupon a sterile aqueous solution thereof is prepared, if desired containing physiologically acceptable crystalloid substances. Such solutions may also be mixed with therapeutically active substances or substances for diagnostic purposes, for example.

Using as a starting material the non-reducing disaccharide sucrose, the products formed will be non-reducing, if part of the glycosidic bonds are not broken up, for example by hydrolysis. Especially in view of the use of these new products for pharmaceutical preparations, their neutral properties are of great value which also applies to the fact that they are not dissociated in aqueous solution. Likewise it is of value that the solutions of the products can be rendered differently viscous within broad limits, in that it is possible to vary the sizes of the molecules. For many purposes, it is of value that they contain glucosidic linkages capable of being broken up, for example by hydrolysis, whereby a depolymerization of the product can take place.

When the novel copolymerisates are to be used for injection and infusion purposes, it is important that a suitable molecular weight distribution can be given to them, for example by fractionation.

Aqueous solutions of the novel copolymerisates can be used to make density gradients for centrifugation, electrophoresis and specific gravity determinations. The solutions are also particularly suitable as a component in the isotonic solutions used for preparation of cells and cell fragments. In this connection, the copolymerisate in aqueous solution will act as a suspension stabilizer.

Aqueous solutions of the copolymerisates can also be used for the purpose of stabilizing other suspensions, for example blood. Another important use of the solutions is for concentrating solutions of sensitive materials by means of dialysis. Since only a small fraction of the copolymerisates penetrates ordinary dialysis bags, the osmotic pressure tends to draw water through the membrane into the solution of the copolymerisate.

EXAMPLES

The following examples are illustrative of preferred embodiments of the present invention. It should be understood that these examples are not intended to limit the invention and that obvious changes may be made by those skilled in the art without changing the essential characteristics and the basic concept of the invention. The percentages are by weight, the temperature is room temperature, and the pressure is atmospheric, unless otherwise indicated.

*Example 1*

240 g. of sucrose were dissolved in 75 g. of water in a flask having a reflux cooler while heating on a boiling water bath, and to the solution were added 165 g. of epichlorohydrin. There were then added, in a dropwise manner and with strong agitation, 65 g. of sodium hydroxide dissolved in 127 g. of water. After the addition of sodium hydroxide, the solution was heated for another 300 min. on a boiling water bath, during which period it became successively more viscous. The reaction was interrupted by neutralization with hydrochloric acid and dilution with water. The polymerisate was purified by precipitation five times with three volumes of acetone and dried in vacuum on a boiling water bath. 260 g. of dry substance having the intrinsic viscosity 0.141 were obtained in a yield of 260 g.

*Example 2*

51 g. of epichlorohydrin were added to a solution of 80 g. of sucrose in 25 g. of water. 23 g. of solid calcium hydroxide were added to the mixture in portions and with strong agitation. The solution was then permitted to stand for 24 hours. During this period the temperature was maintained at 70° C. The reaction solution was filtered, then neutralized with aqueous hydrochloric acid and diluted with 400 g. of water. The salt was removed by passing the solution through ion exchanger columns, first through a strong anion exchanger (IRA–400) and then through a weak cation exchanger (IRC–50). After adjusting pH upon 7–8, the copolymerisate was dried by evaporation under vacuum on a boiling water bath. 35 g. of a product having the intrinsic viscosity 0.074 were obtained.

Example 3

To a solution of 80 g. of sucrose in 25 g. of water were added 74 g. of 1,3-dichloro-2-propanol. 46 g. of sodium hydroxide dissolved in 46 g. of water were added to the solution, in a dropwise manner and with strong agitation, at 70° C. After the addition of sodium hydroxide, the reaction mixture was permitted to stand for 5 hours at 70° C. and at pH 13–14. The solution was filtered, neutralized with hydrochloric acid, diluted with water to a volume of 500 ml., precipitated three times with two volumes of isopropanol and dried under vacuum on a boiling water bath. 91 g. of a product having the intrinsic viscosity 0.076 were obtained.

Example 4

To a solution of 80 g. of sucrose and 15.5 g. of sodium hydroxide in 40.5 g. of water were added 35 g. of epichlorohydrin. The reaction mixture was permitted to stand for 2 hours at a temperature of 23–28° C. with strong agitation. When a uniform solution had been obtained, the pH thereof was adjusted to 13 with aqueous sodium hydroxide solution. After 4 days at room temperature, the experiment was interrupted by dilution with water and neutralization with hydrochloric acid. Four precipitations with 2 volumes of isopropanol and drying of the precipitate yielded a product having the average molecular weight $(\overline{M}_W) = 1,500,000$ measured by light scattering.

Example 5

To a solution of 80 g. of sucrose and 13 g. of sodium hydroxide in 38 g. of water were added 3 g. of bensyltrimethylammonium chloride and 30 g. of epichlorohydrin. The reaction mixture was agitated strongly for 2 days, the temperature being not permitted to exceed 26° C. The uniform solution was then permitted to stand for 7 days at room temperature, then precipitated three times with two volumes of isopropanol and dried under vacuum on a boiling water bath. The average molecular weight $(\overline{M}_W)$ was measured by light scattering and found to be 12,000.

Example 6

Out of the product from Example 1, 50 g. were dissolved in 150 ml. of water. An addition of 400 ml. of 96 percent ethyl alcohol yielded a precipitate containing 12.3 g. of dry substance and the intrinsic viscosity 0.279. to the mother liquor were added 400 ml. of 96 percent ethanol, thereby to precipitate 16.2 g. of a substance having the intrinsic viscosity 0.149. A third fraction weighing 4.8 g., having the intrinsic viscosity 0.060 was precipitated by adding 1,000 ml. of 96 percent ethanol. The remaining solution was evaporated under vacuum to the volume 70 ml. and precipitated with 200 ml. of 96 percent ethanol. 11.6 g. of a product having the intrinsic viscosity 0.037 were obtained. Evaporation of the mother liquor to dryness yielded 1.0 g. of a substance having the intrinsic viscosity 0.017. By measuring the light scattering the average molecular weights $(\overline{M}_W)$ of the first three fractions were determined to be 2,000,000, 280,000 and 16,000, respectively.

Example 7

100 g. of a copolymerisate having the intrinsic viscosity 0.056 were dissolved in water to a volume of 1,000 ml., and to the solution were added 1,500 ml. of 99 percent isopropanol. After 3 days, a precipitate had deposited, and the overlying solution was clear. The precipitate was separated and dissolved in water to a volume of 500 ml. and precipitated with 750 ml. of isopropanol. To the mother liquor from the first precipitation were added another 500 ml. of isopropanol. After separating the precipitate, the mother liquor was evaporated to dryness. In this manner four fractions were obtained, each of which were dissolved separately and precipitated once wholly. The yield and intrinsic viscosity, respectively, of the fractions obtained were the following:

(1) 9.2 g.$[\eta]=0.122$
(2) 32.2 g.$[\eta]=0.079$
(3) 16.3 g.$[\eta]=0.050$
(4) 37.4 g.$[\eta]=0.028$ The total yield was 95 percent.

Example 8

Out of the fraction from Example 6 having the intrinsic viscosity 0.149 and a fraction prepared in a similar manner having the intrinsic viscosity 0.105 ($\overline{M}_W = 50,000$) were prepared aqueous 6 percent solutions in water free from pyrogens, containing 0.9 percent of sodium chloride. The solutions were sterilized by autoclaving and injected intravenously into rabbits. One rabbit weighing 4.20 kg. received 1.24 g. per kg. of body weight of the fraction having the intrinsic viscosity 0.149. During 24 hours, 6.5 percent of the supplied quantity were excreted by the urine. Another rabbit weighing 4.01 kg. received 1.24 g. of the fraction having the intrinsic viscosity 0.105 per kg. of body weight. During 24 hours 39 percent of the supplied quantity was excreted by the urine.

Example 9

A mixture of 80 g. of sucrose, 38 g. of water and 13 g. of sodium hydroxide was dispersed, by strong agitation, in 150 ml. of dioxane. 30 g. of epichlorohydrin were added to the dispersion. During the whole experiment a temperature of 90° was maintained while strongly agitating the mixture. After 5 hours, the phases were separated from each other. The heavier fraction was diluted with water, neutralized and precipitated 4 times with 3 volumes of 99 percent isopropanol. The polymer obtained had the intrinsic viscosity 0.058.

Example 10

5 g. of a polymer obtained in the same manner as set forth in Example 1, having the intrinsic viscosity 0.168 were dissolved in 90 ml. of water. To the solution was added aqueous 2 N hydrochloric acid, until the pH of the solution became 1.2. The temperature was maintained at 22° C. Samples were taken out once every hour and the intrinsic viscosity thereof was determined. After 1 hour the intrinsic viscosity was 0.153, after 2 hours 0.140 and after 4 hours 0.114. The reduceability of the product was also determined for the samples taken out. As expected, the amount of reducing groups increased depending upon how far the depolymerization had proceeded due to the hydrolysis of glucosidic bonds.

MISCELLANEOUS

Those skilled in the chemical arts and particularly in the art to which this invention pertains will readily appreciate that many modifications of the basic invention set forth here are possible. For example, it is quite possible the other closely related compounds and reaction conditions might work as well as the herein specifically described compounds and reaction conditions, and there would certainly be no invention involved in trying such closely related compounds and reaction conditions in view of the present broad disclosure. All of these modifications are considered to be within the scope of the present claims by virtue of the well-established "doctrine of equivalents."

What is claimed is:

1. An agent for making aqueous colloid solutions of high density and low viscosity consisting of a copolymerizate built up of sucrose residues bonded together by ether bridges of the general type —S—O—R—O—S—. wherein the symbols S each represent a sucrose residue and R is an alkyl radical, containing from 3 to 10, inclusive, carbon atoms, the average molecular weight $(\overline{M}_W)$ of said copolymerizate being in the range of from 5,000 to 1,000,000.

2. An agent for the preparation and conservation of sensitive bioligical materials consisting of a copolymerizate built up of sucrose residues bonded together by ether bridges of the general type —S—O—R—O—S—, wherein the symbols S each represents a sucrose residue and R is an alkyl radical, containing from 3 to 10, inclusive, carbon atoms, the average molecular weight ($\overline{M}_w$) of said copolymerizate being in the range of from 5,000 to 1,000,000.

References Cited by the Examiner

UNITED STATES PATENTS 2,585,035    2/1952    Roach et al. _____ 260—209
3,042,666    7/1962    Gentles _____ 260—209

LEWIS GOTTS, *Primary Examiner.*

ELBERT L. ROBERTS, *Examiner.*

JOHNNIE R. BROWN, *Assistant Examiner.*